Feb. 9, 1943.  H. G. KAMRATH  2,310,528
AIR CLEANER
Filed July 13, 1940
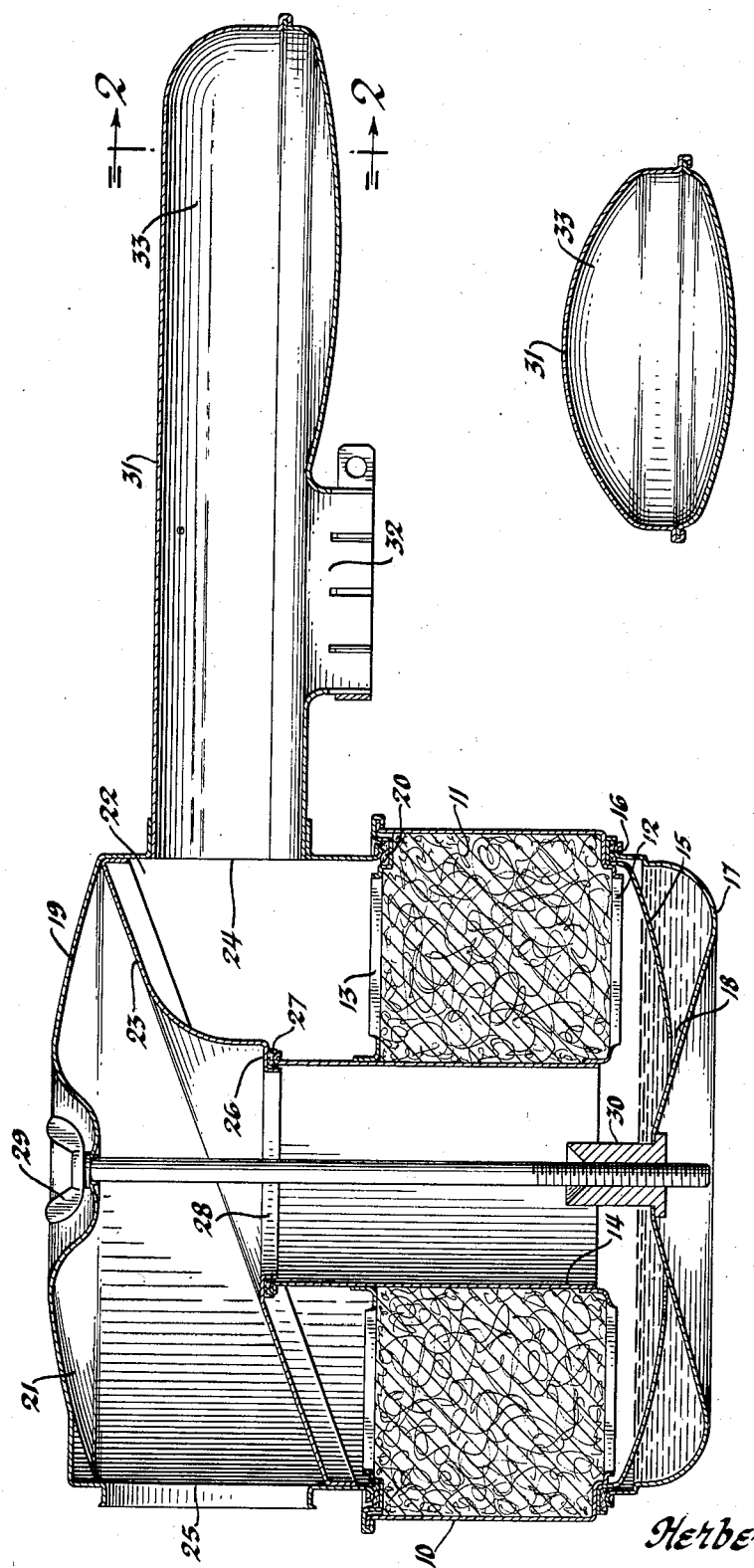
Inventor
Herbert G. Kamrath
By
Blackmore, Spencer & Flint
Attorneys Patented Feb. 9, 1943

2,310,528

UNITED STATES PATENT OFFICE 2,310,528

AIR CLEANER

Herbert G. Kamrath, Flint, Mich., assignor to General Motors Corporation, Detroit, Mich., a corporation of Delaware Application July 13, 1940, Serial No. 345,314

1 Claim. (Cl. 183—15)

This invention has to do with air cleaner and silencer assemblies and has for its principal object to provide an assembly of a liquid-bath type air cleaner and a side branch type silencer which is of cheap and simple construction, requires a minimum of space for its installation, functions efficiently and offers a minimum of resistance to the passage of air through it.

Other features of the invention are the construction and arrangement of the parts of the air cleaner and the construction and disposition of the silencer with respect to the air cleaner and the orifice through which air leaves the assembly.

For a better understanding of the nature and objects of this invention, reference is made to the accompanying specification wherein is described the preferred embodiment of the invention which is illustrated in the accompanying drawing.

In the accompanying drawing:

Figure 1 is a vertical section through an air cleaner and silencer assembly in accordance with my invention.

Figure 2 is a section taken on the line 2—2 of Figure 1.

The air cleaner illustrated in the drawing includes a filter member which consists of an annular container 10 filled with a suitable filter medium 11 which is wetted with a suitable liquid before the air cleaner is put into use. The inner and outer walls of the filter member are imperforate but the lower and upper walls thereof have in them rings of air inlet and outlet orifices 12 and 13. As the drawing shows, the inner wall of the filter member 10—11 is in the form of a tube 14 which extends to a point well above the upper edge of the outer wall.

To the filter member there is secured, by welding or in any other suitable manner securing its outer edge to the lower wall of the filter member without the orifices 12, a dished annular baffle 15 with its inner edge almost directly below the inner edges of the orifices 12. Seated against a gasket 16 disposed in an inverted channel formed in the outer edge of the baffle 15 is the upper edge of the side wall of a bowl-like member 17 whose bottom is inclined upwardly from near its outer edge to its center. The baffle 15 is dished to such an extent that its inner edge is disposed well below the filter member but as to leave a comparatively narrow annular aperture 18 between it and the bottom of the bowl-like member 17.

Before the air cleaner is put into use the bowl-like member 17 is filled to the level indicated in the drawing with the liquid with which the filter medium is wetted. This body of liquid is, as the drawing shows divided by the baffle 15 into two portions of which one is above and the other below the baffle. The portion of the body of liquid below the baffle communicates with that above the baffle through the aperture 18 but is not otherwise in communication with the atmosphere.

Over the upper end of the filter member there is disposed an inverted-cup-shaped cover 19 with the lower edge of its side wall seated on a gasket 20 disposed in a channel in the upper wall of the filter member without the orifices 13. The interior of the cover 19 is divided into an air inlet compartment 21 and an air outlet compartment 22 into which the air outlet orifices 13 in the filter member open by an inclined partition 23. From the compartment 22 in the zone of its maximum height there opens through the side wall of the cover an air outlet orifice 24 and into the compartment 21 at a point diametrically opposite the air outlet orifice 24 there opens an air inlet orifice 25. The center portion of the partition 23 is depressed at an angle to its plane to provide a flange 26 which is seated on the upper end of the tube 14 through the intermediary of a gasket 27 and has in it an orifice 28 which opens into the upper end of the tube.

To maintain the parts of the air cleaner in the relation in which they have been described there is provided a long thumbscrew 29 which extends through the cover 19 and is threaded into a member 30 suitably secured in an orifice in the bottom of the bowl-like member 17.

In the air outlet orifice 24 in the cover 19 there is secured one end of a flattish tube 31 which has in its lower side an air outlet orifice 32. The tube 31 is extended outwardly beyond the air outlet orifice 32 and closed at its extremity to provide a sound wave attenuating recess 33.

The assembly shown in the drawing was designed for installation on an internal combustion engine with the air outlet orifice 32 in the tube 31 connected to the air intake tube of the carburetor. When the assembly is so installed and the engine is operating the suction created by the pistons of the engine on their suction strokes draws air through the air inlet orifice 25 in the cover 19 into the inlet compartment 21, thence, through the tube 14 and the filter medium 11, into the outlet compartment 22 in the cover 19, and thence, through the orifice 24, the portion of the tube 31 between the orifice 24 and the orifice 32 in the tube, and the orifice 32, into the carburetor and cylinders of the engine. In the course of its passage through the assembly the air will, of course, be freed of foreign matter by the air cleaner.

The portion of the tube 31 between the orifice 32 and the closed end of the tube which constitutes the sound wave attenuating recess 33 is preferably made equal in length to one-quarter of the wave length of the most objectionable sound wave in the intake noise of the engine on which the assembly is to be installed so that it will function as a closed tuning pipe to attenuate the most objectionable sound wave in the intake noise of the engine and thus suppress the intake noise. In the case of the engine for which the sound wave attenuating recess illustrated in the drawing was designed, which was the propelling engine of a well known make of automotive vehicle, the objectionable sound waves of low frequency were sufficiently attenuated by a long air inlet duct connected to the air inlet orifice of the air cleaner with which the sound wave attenuating recess was associated. To attenuate the remaining objectionable sound wave in the intake noise of this engine, the sound wave attenuating recess was made equal in depth to one-quarter of the wave length of this sound wave. This made the sound wave attenuating recess about six (6) inches deep, and I apprehend that a sound wave attenuating recess of about this depth will be efficacious in silencing the intake noises of the propelling engines of most, if not all, automotive vehicles because most, if not all, of them contain an objectionable sound wave whose wave length is about four times a dimension of this order.

In the course of its travel from the tube 14 into the filter medium 11 of the air cleaner the air will, of course, strike the surface of the liquid in the bowl-like member 17 and pick up and carry some of it into the filter medium. The baffle 15 prevents the air from picking up the liquid below it and shields this portion of the pool of liquid in the bowl-like member from disturbance by the air. The baffle thus prevents the air from picking up too much liquid when it is traveling at a rapid rate through the air cleaner and establishes below it a zone in which the foreign matter extracted from the air by the air cleaner can settle and from which it cannot again be picked up by the air traveling through the air cleaner.

The provision of the inclined partition 23 in the cover 19 reduces the tendency of the air to pass through the portion of the filter medium 11 on the side of the air cleaner through which the air outlet orifice 24 in the cover opens to the exclusion of the rest of the filter medium and thus promotes the efficiency of the air cleaner.

It is, of course, apparent that when the thumb-screw 29 is removed the bowl-like member 17, the filter member and baffle assembly 10—11—15 and the cover 19 may be separated one from the others, which, of course, facilitates cleaning of the filter and bowl-like members and refilling the bowl-like member with liquid when this becomes necessary.

I claim:

In an appliance of the class disclosed, a bowl-like member which constitutes a liquid reservoir, an annular filter member with a center tube which extends upwardly beyond the level of the portion of the filter member which encircles it disposed above the bowl-like member with the center tube and the portion of the filter member which encircles it opening at their lower ends into the bowl-like member, a cover shaped like an inverted bowl disposed above the filter member, an inclined partition which divides the interior of the cover into a lower compartment into which the portion of the filter member which encircles the center tube opens at its upper end and an upper compartment and has in it a depression whose bottom is disposed at a right angle to the axis of and is seated on the upper end of the center tube of the filter member with an orifice in it through which the upper compartment opens into the tube, an air inlet orifice which opens into the upper compartment through the side wall of the cover, and an air outlet orifice which opens from the lower compartment at its point of maximum height through the side wall of the cover.

HERBERT G. KAMRATH.